(12) United States Patent
Olden et al.

(10) Patent No.: US 12,118,110 B2
(45) Date of Patent: Oct. 15, 2024

(54) IDENTITY QUERY LANGUAGE SYSTEMS AND METHODS

(71) Applicant: Strata Identity, Inc., Boulder, CO (US)

(72) Inventors: Eric Michael Olden, Niwot, CO (US); Christopher Eugene Marie, San Juan, PR (US); Carl Eric Leach, San Diego, CA (US); Mike Barinek, Boulder, CO (US); Gerry Joseph Gebel, Scottsdale, AZ (US); Phillip James Dennis Hunt, Vancouver (CA)

(73) Assignee: STRATA IDENTITY, INC., Boulder, CO (US)

( * ) Notice: Subject to any disclaimer, the term of this patent is extended or adjusted under 35 U.S.C. 154(b) by 240 days.

(21) Appl. No.: 17/712,670

(22) Filed: Apr. 4, 2022

(65) Prior Publication Data

US 2022/0318416 A1 Oct. 6, 2022

Related U.S. Application Data (60) Provisional application No. 63/170,398, filed on Apr. 2, 2021.

(51) Int. Cl.
*G06F 21/62* (2013.01)
*G06F 16/25* (2019.01)
*G06F 21/60* (2013.01)

(52) U.S. Cl.
CPC ........ *G06F 21/6218* (2013.01); *G06F 16/256* (2019.01); *G06F 21/604* (2013.01);
(Continued)

(58) Field of Classification Search
CPC .. G06F 21/6218; G06F 16/256; G06F 21/604; G06F 2221/2101; G06F 2221/2141
See application file for complete search history.

(56) References Cited

U.S. PATENT DOCUMENTS

| 8,490,163 | B1 * | 7/2013 | Harsell | ............... G06F 21/6236 |
| | | | | 726/6 |
| 10,333,983 | B2 | 6/2019 | Vaidya et al. | |

(Continued)

FOREIGN PATENT DOCUMENTS

| CN | 108923991 A | 11/2018 |
| CN | 107872432 B | 12/2020 |

(Continued)

OTHER PUBLICATIONS

Takabi, Hassan, et al., Policy Management as a Service: An Approach to Manage Policy Heterogeneity in Cloud Computing Environment; 45th Hawaii International Conference on System Sciences; 2012; 9 pages.

(Continued)

*Primary Examiner* — Abiy Getachew
(74) *Attorney, Agent, or Firm* — Kutak Rock LLP; Jason S. Jackson (57) ABSTRACT

A system, apparatus, and method for policy management is provided. The system, apparatus, and method provide a universal policy management solution to unify multiple bespoke systems to enable management of access and other policies in distributed and/or heterogeneous environments. The system, apparatus, and method uses or may be referred to as Identity Query Language or "IDQL." Policies and user access are defined centrally, and these policies are distributed out to the various bespoke systems. This distribution is aided by a policy gateway, or orchestrator, which acts as a policy mapper and/or API wrapper which accepts IDQL policy configurations, maps them to an imperative identity system, and carries out the IDQL command in the identity systems' native API calls.

15 Claims, 5 Drawing Sheets

(52) U.S. Cl.
CPC .............. *G06F 2221/2101* (2013.01); *G06F 2221/2141* (2013.01)

(56) References Cited

U.S. PATENT DOCUMENTS

| | | | | |
|---|---|---|---|---|
| 2014/0215554 A1* | 7/2014 | Roberts | ................ | H04W 8/245 |
| | | | | 726/1 |
| 2015/0237072 A1* | 8/2015 | Nukala | ................ | H04W 12/08 |
| | | | | 726/1 |
| 2017/0331692 A1* | 11/2017 | Hague | ................ | H04L 41/0893 |
| 2018/0167417 A1* | 6/2018 | Kirner | ................ | H04L 63/104 |
| 2020/0382516 A1* | 12/2020 | Achari | ................ | H04L 41/0894 |

FOREIGN PATENT DOCUMENTS

| | | |
|---|---|---|
| FR | 3007865 A1 | 1/2015 |
| KR | 100582722 B1 | 5/2006 |
| WO | 2022212949 A1 | 10/2022 |

OTHER PUBLICATIONS

"InterInternational Search Report and Written Opinion Received for PCT Application No. PCT/US2022/023328, Search completed on Aug. 3, 2022 Mailed on Aug. 10, 2022".

"International Preliminary Report on Patentability for International Application No. PCT/US2022/023328, Report issued on Oct. 3, 2023, Mailed on Oct. 12, 2023."

\* cited by examiner

IDENTITY QUERY LANGUAGE SYSTEMS AND METHODS

CROSS-REFERENCE TO RELATED APPLICATIONS

This application claims priority pursuant to 35 U.S.C. 119(e) to U.S. Provisional Patent Application Ser. No. 63/170,398, filed Apr. 2, 2021, the entire disclosure of which is incorporated herein by reference.

FIELD OF THE INVENTION

The present invention relates generally to identity and user access policy. More specifically, the present invention is concerned with apparatuses, systems, and methods for identity and access management.

BACKGROUND

Organizations seek to manage consistent identities and user access policies on multiple cloud platform. Traditionally this access is managed by multiple identity management systems that are strictly associated with a respective cloud platform, which can be referred to as a "bespoke" identity system. For example, consider a situation where an organization runs its applications on three different cloud platforms. Access to these applications is managed by multiple identity management systems that are "built into" the respective cloud platform (aka bespoke identity systems). Each of the identity systems uses its own proprietary way to manage application access in the form of access policies. For example, and application access policy could be "The Inventory Application can be only accessed by employees." This policy is represented in bespoke identity systems according to the proprietary structure of its data model and architecture. As these propriety structures differ, so too does the representation of the access policy data which the organization must pass to each system. Thus, managing access to these applications requires setting policy in three different identity systems. Similarly, auditing access policies requires checking policy in three different systems. This is very complex, expensive, error-prone, and subject to drift and security vulnerability.

Accordingly, there is a long-felt but unmet need in the art for a single data representation which enables the organization to manage access to applications in a consistent, more secure way, regardless of which cloud platform is used, and to reduce manual efforts required to manage policy in multiple places.

Organizations are also tasked with managing consistent identity and user access policy across different layers of the technology stack. Consider an organization which builds its web applications using a microservices architecture, built using a "service mesh" technology. A service mesh is a dedicated infrastructure layer for facilitating service-to-service communications between services or microservices, typically using a proxy. Access to the web application is managed by an application identity system. The application identity system manages users. Access and authorization to the microservices that make up the application is managed by a service identity system enforced as a proxy in front of the service mesh and microservices platform. This service identity system manages non-human programmatic or service identities. These service identities represent human identities. Service identities are correlated with the identity at the origin of the web service request, which is the human user. Presently, managing access policies for user and service identities is done using two separate methods, one for the management of user identity and one for the management of the service identity. This adds complexity and is expensive, error-prone, and subject to drift and security vulnerability.

Accordingly, there is a long-felt but unmet need in the art to provide unified identity and user access policy management across different layers of the technology stack and across multiple bespoke systems.

SUMMARY

The present invention comprises apparatuses, systems, and methods for policy management. In some embodiments, the apparatuses, systems, and methods incorporate or are otherwise referred to as Identity Query Language ("IDQL"), which in some embodiments provides an approach for managing access and other policies in distributed and/or heterogeneous environments. Systems that use IDQL can easily and consistently manage policies for applications and resources running anywhere including micro-services, cloud computing, Zero Trust Architectures ("ZTAs"), and edge computing. It will be appreciated that in the present disclosure reference may be made to one or more of "apparatus (es)", "system(s)", and/or "method(s)" and that the disclosure relevant to these references is relevant to each of the embodiments of the system, be it apparatus, system, and/or method.

In some embodiments, the system manages identity, access, and other policies across distributed, heterogeneous environments and organizational boundaries. In some embodiments, the system defines user access and other policies via human-readable declarative statements. In some embodiments, these policies are distributed to identity systems that then enforce them, for instance, when determining whether a user can access a web app and/or provision a compute cluster.

In some embodiments, a policy gateway is provided. In some embodiments, the policy gateway is referred to as an "orchestrator." In some embodiments, the policy gateway performs the function of policy mapper and/or API wrapper that accepts IDQL policy configurations, maps them to an imperative identity system (like Lightweight Directory Access Protocol ("LDAP") or Commercial Off the Shelf ("COTS") identity and security management products), and carries out the IDQL command in the identity systems' native API calls. In this way it is possible to define an access or other policy centrally in a primary policy management point ("PPMP"), distribute that policy to multiple policy gateways, transform the policy into bespoke policy of an identity system, and then have that policy enforced local to an identity system acting as a policy enforcement point ("PEP"). Embodiments of the present invention thus support the flow of policies across this distributed environment.

Accordingly, various embodiments of the present invention provide systems, methods, and apparatuses for policy management comprising a primary policy management point ("PPMP") configured to define a single or universal policy that can be implemented in a plurality of bespoke systems. The systems, in some embodiments, further include a policy gateway configured to receive the universal policy from the PPMP, translate the universal policy into a bespoke policy for each of the plurality of bespoke systems, and implement each of the bespoke policies in each of the plurality of bespoke systems. The universal policy can be defined using a declarative syntax in any embodiment of the present invention. The declarative syntax, in some embodiments, further comprise a human-readable data serialization standard, such as YAML.

In some embodiments of the invention, the PPMP is configured to securely distribute the bespoke policy to the policy gateway. The policy gateway also validates the universal policy received from the PPMP. In some embodiments the policy gateway implements a bespoke policy using an application programming interface ("API"), command line interface ("CLI"), or other interface of a bespoke system. In some embodiments the policy gateway monitors each bespoke system for policy changes. In some embodiments, the universal policy comprises one or more of an authentication policy, an access control policy, an authorization policy, an attribute policy, and an auditing policy. Some embodiments include a plurality of policy gateways, wherein each policy gateway is configured to implement the universal policy in a plurality of bespoke systems.

In some embodiments, a method for policy management is provided. In some embodiments, the method includes defining a universal policy for a plurality of bespoke systems, translating the universal policy into a bespoke policy for each of a plurality of bespoke systems, and implementing each of the bespoke policies in each of the plurality of bespoke systems. In some embodiments, the defining includes defining, at a primary policy management point ("PPMP"), a universal policy for a plurality of bespoke systems. In some embodiments, the translating step includes translating, at a policy gateway, the universal policy into a bespoke policy for each of a plurality of bespoke systems. In some embodiments, the translation occurs during discovery. In some embodiments, when an orchestrator (policy gateway) connects to a target system, it discovers the existing policies and converts them to IDQL for display in the PPMP. In some embodiments, the implementing step includes implementing, at a policy gateway, each of the bespoke policies in each of the plurality of bespoke systems.

In some embodiments, the PPMP securely distributes the bespoke policy to a policy gateway. The policy gateway, in some embodiments, validates the universal policy received from a PPMP. In some embodiments, the policy gateway implements a bespoke policy using an application programming interface (API) of a bespoke system. In some embodiments, the policy gateway monitors each bespoke system for policy changes. In some embodiments, the method includes a plurality of policy gateways, wherein each policy gateway is configured to implement the universal policy in a plurality of bespoke systems.

Some embodiments of the present invention provide systems, apparatuses, and methods relating to a PPMP. By way of example, some embodiments of the invention provide a system and an apparatus for policy management comprising a processor configured to define a universal policy for a plurality of bespoke systems. In some embodiments, the universal policy is defined using a declarative syntax, which in some embodiments includes a human-readable data serialization standard such as YAML. In some embodiments, the processor securely distributes the bespoke policy to a policy gateway. In some embodiments, the policy gateway validates the universal policy received from the PPMP. The policy gateway, in some embodiments, implements a bespoke policy using an API or CLI of a bespoke system. In some embodiments, the policy gateway monitors each bespoke system for policy changes.

Some embodiments of the invention provide a method for policy management. In some embodiments, the method includes defining a universal policy for a plurality of bespoke systems. The defining step, in some embodiments, includes defining, at a primary policy management point ("PPMP"), a universal policy for a plurality of bespoke systems. The method, in some embodiments, includes securely distributing the bespoke policy to a policy gateway. In some embodiments, the method includes validating, at a policy gateway, the universal policy received from a PPMP. The method, in some embodiments, further comprises implementing, at a policy gateway, a bespoke policy using an API or CLI of a bespoke system. In some embodiments, the method includes monitoring, at a policy gateway, each bespoke system for policy changes.

Some embodiments of the present invention provide systems, apparatuses, and methods relating to a policy gateway. Some embodiments include a system and/or an apparatus for policy management including a processor configured to receive a universal policy, translate the universal policy into a bespoke policy for a plurality of bespoke systems, and implement each of the bespoke policies in each of the plurality of bespoke systems. The universal policy, in some embodiments, is defined using a declarative syntax, including in some embodiments using a human-readable data serialization standard. In some embodiments, the universal policy is received from a primary policy management point ("PPMP"). In some embodiments, the PPMP securely distributes the universal policy to the processor. The processor, in some embodiments, then validates the universal policy received from the PPMP. In some embodiments, the processor implements a bespoke policy using an API or CLI of a bespoke system. In some embodiments, the processor monitors each bespoke system for policy changes. In various embodiments the universal policy is one or more of an authentication policy, an access control policy, an authorization policy, an attribute policy, and an auditing policy.

Figure 1:
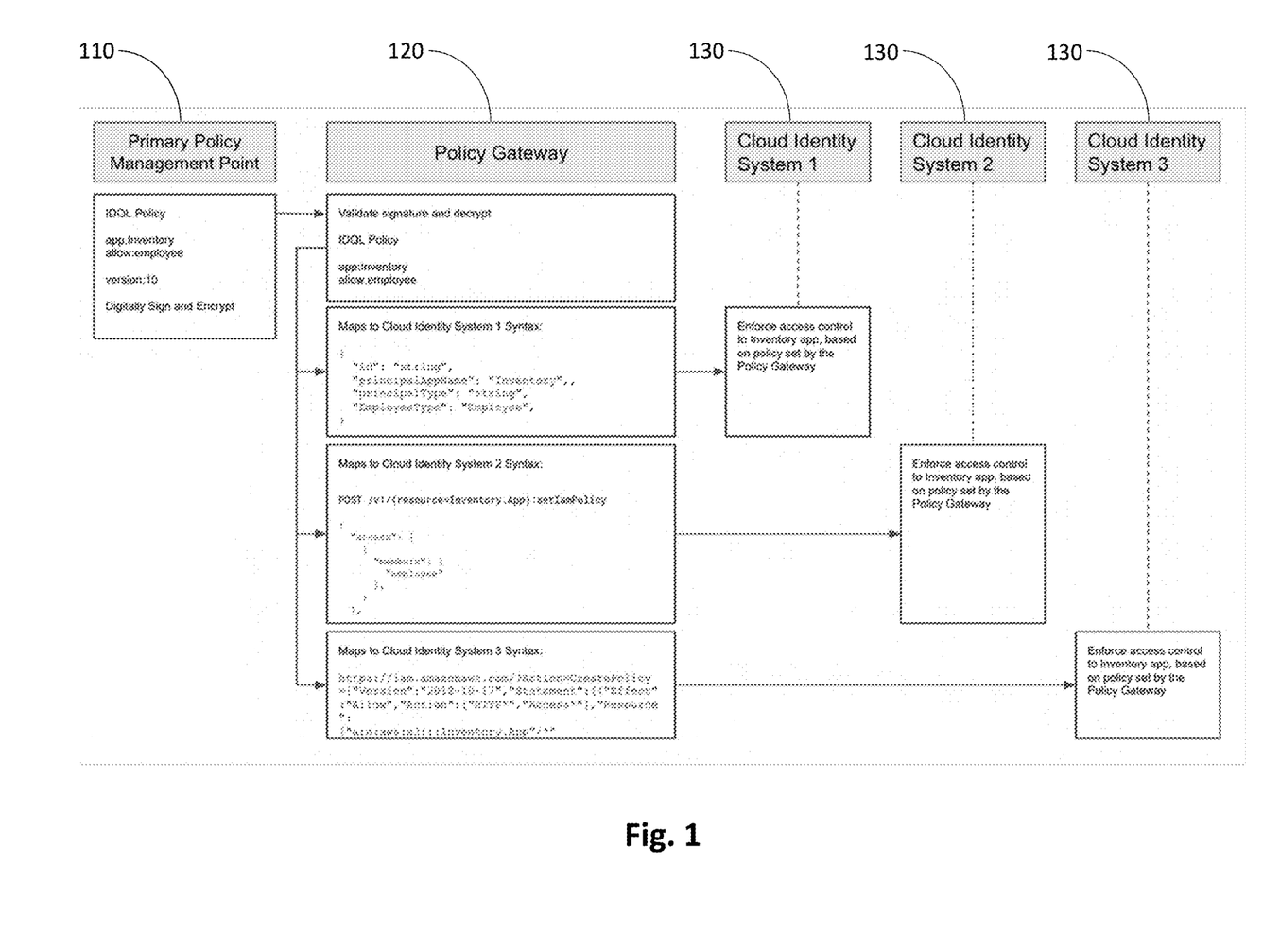
FIG. 1 is a flowchart demonstrating a system and method according to some embodiments of the present invention.

The various embodiments of the present invention provide numerous advantages. For example, a single data representation is provided which enables an organization to manage access to applications in a consistent, more secure way, regardless of which cloud platform is used, and to reduce manual efforts required to manage policy in multiple places. This provides improved security, error rates, lessened drift, and is more cost effective. Referring to FIG. 1, using IDQL against the example provided in the background of this disclosure, policies for all three platforms are configured in a single place, automating policy management tasks and streamlining audit reporting. The Primary Policy Management Point ("PPMP") 110 is used to configure the access policy, "The Inventory Application can be only accessed by employees." using a declarative syntax. This policy, created in the PPMP 110, is then securely distributed to the bespoke identity systems 130 through a Policy Gateway 120. The Policy Gateway 120 receives the policy, validates the version and authenticity, and then maps the IDQL policy to the proprietary policy of the bespoke identity system 130. Finally, the Policy Gateway 120 implements the policy in the bespoke identity system through its API. The Policy Gateway 120 validates the policy in bespoke identity systems 130 and then reports back to the PPMP 110 success or failure of the policy distribution. The bespoke identity system 130 manages access to applications using the policy set by the Policy Gateway 120/PPMP 110, while the Policy Gateway 120 monitors changes logs to identify if any policy changes happen at the bespoke identity system 130 and if any happen, they are reported to the PPMP 110.

Figure 2:
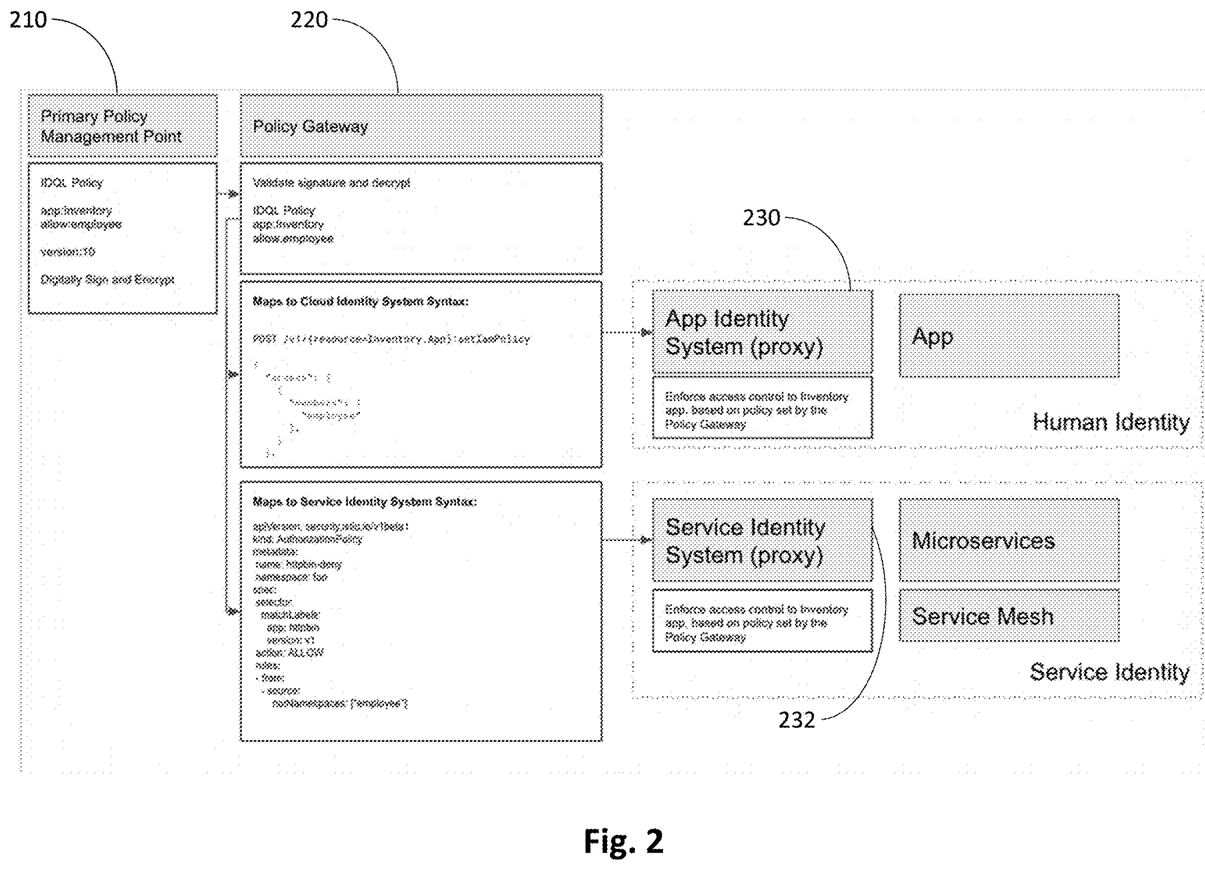
FIG. 2 is a flowchart demonstrating a system and method according to some embodiments of the present invention.

Further advantages of the disclosed embodiments are evident. For example, a system and method are provided which enabled an organization to allow access to the inventory application and the related web services by employees only and which enabled management of access policies in one place while having them enforced in multiple bespoke systems. Referring to FIG. 2, using IDQL against the example provided in the background of this disclosure, policies for the two identity systems are configured in a single place, automating policy management tasks and streamlining audit reporting. The Primary Policy Management Point ("PPMP") 210 is used to configure the access policy, "The Inventory Application can be only accessed by employees." using a declarative syntax. This policy, created in the PPMP 210, is then securely distributed to the bespoke identity systems through a Policy Gateway 220. The Application Identity System 230 policies are updated by the Policy Gateway 220, and the Service Identity System 232 policies are updated by the Policy Gateway 220. The Policy Gateway 220 receives the policy, validates the version and authenticity, and then maps the IDQL policy to the proprietary policy of the bespoke identity system. Finally, the Policy Gateway 220 implements the policy in the bespoke identity system through its API. The Policy Gateway 220 validates the policy in bespoke identity systems and then reports back to the PPMP 210 success or failure of the policy distribution. The bespoke identity system manages access to applications using the policy set by the Policy Gateway/PPMP. Policy Gateway monitors change logs to identify if any policy changes happen at the bespoke identity system and if any happen, they are reported to the PPMP.

The foregoing and other objects are intended to be illustrative of the invention and are not meant in a limiting sense. Many possible embodiments of the invention may be made and will be readily evident upon a study of the following specification and accompanying drawings. Various features and subcombinations of invention may be employed without reference to other features and subcombinations. Other objects and advantages of various aspects of the present invention will become apparent from the following description taken in connection with the accompanying drawings. Any reference herein to a "present" or "preferred" invention or embodiment shall not be considered as limiting on any other embodiment or invention disclosed herein.

BRIEF DESCRIPTION

The accompanying drawings, which are incorporated in and constitute part of this specification, illustrate embodiments of the invention and together with the description explain the principles of various embodiments of the invention. The embodiments described in the drawings and specification in no way limit or define the scope of the present invention.

DETAILED DESCRIPTION

As required, a detailed description of the present invention is disclosed herein; however, it is to be understood that the disclosed embodiments are merely exemplary of the principles of the invention, which may be embodied in various forms. Therefore, specific embodiments, aspects, and structural and functional details disclosed herein are not to be interpreted as limiting, but merely illustrative.

Figure 3:
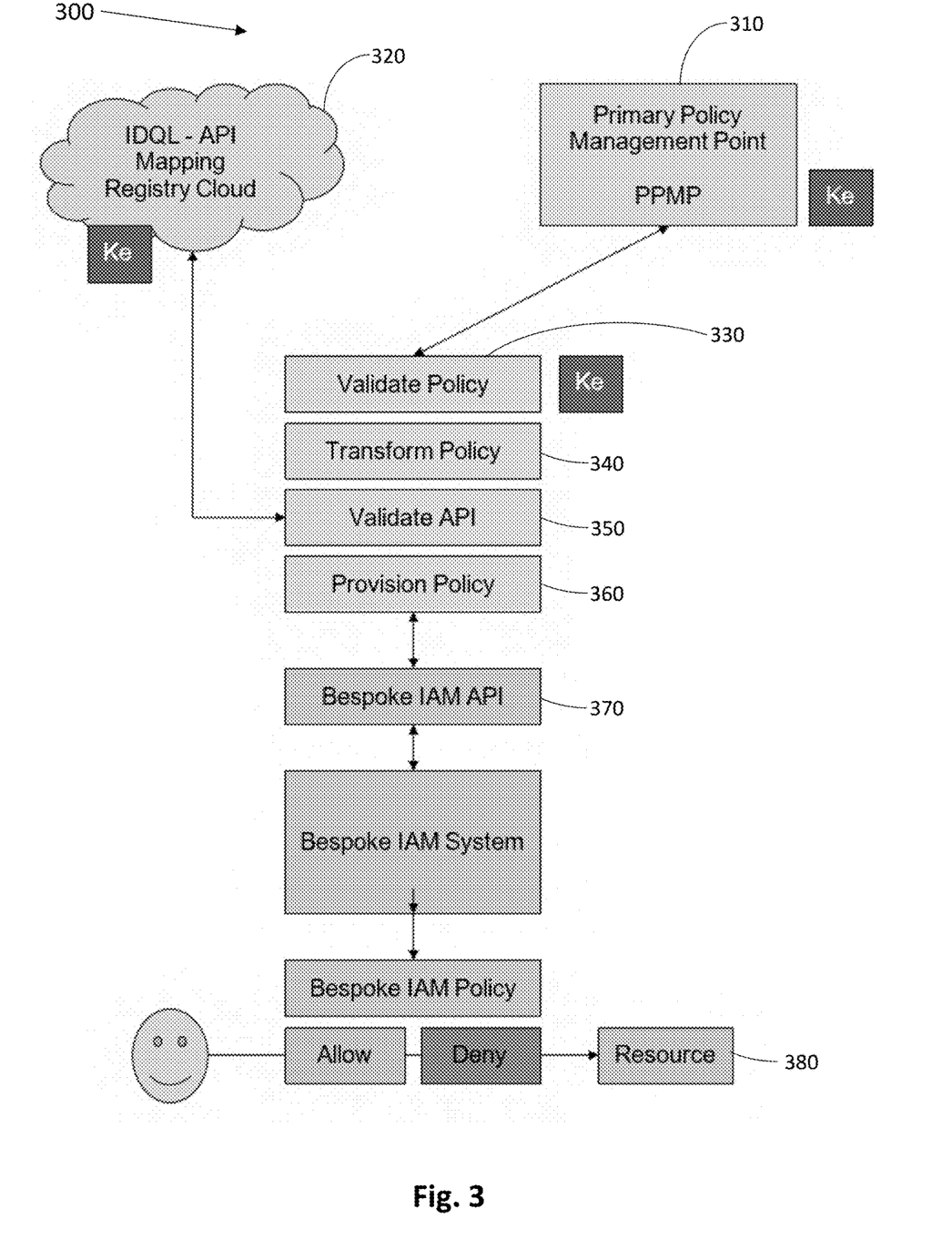
FIG. 3 is a flowchart demonstrating a system and method according to some embodiments of the present invention.

Referring, generally, to FIG. 3, in some embodiments, a system and method of policy management 300 is provided. In some embodiments, the policy management 300 is a system and method for universal access policy management. In some embodiments, the system, apparatus, and method enable management of access policies across a plurality of resources 380 and identity systems. In some embodiments, the plurality of resources 380 include, but are not imitated to: access policy, which in some embodiments is a policy that dictates whether a particular resource 380 may be accessed, (e.g. read or viewed) by a user; Primary Policy Management Point ("PPMP") 310, which in some embodiments is where access policy is defined in the IDQL language; IDQL Policy Gateway, which in some embodiments receives policy from the PPMP 310, validates, transforms/maps, and then provisions policy through the APIs of the integrated identity system; and the like. In some embodiments, users access resources through the protocol and enforcement of the policy by an integrated identity system. In some embodiments, such an indirect access control works through the direct Policy Enforcement Point of the integrated identity system.

In some embodiments, universal access policy management is accomplished wherein the PPMP 310 is used to configure an access policy in the IDQL language. In some embodiments, the PPMP encrypts the policy and communications the policy at rest and in motion. In some embodiments, the policy is distributed to one or more gateway, such as IDQL Policy Gateways that are, in some embodiments, registered with the IDQL fabric. In some embodiments, "registered" means authenticated and authorized to communicate as a result of a Public Key Infrastructure ("PKI") key exchange. In some embodiments, the Policy Gateway decrypts the communication from the PPMP. In some embodiments, the policy is validated 330 by the Policy Gateway against the PPMP 310 to ensure that the latest version of the policy is current and that the policy had not been tampered with in transmission through checksum. The Policy Gateway, in some embodiments, has error handling capabilities. In some embodiments, the Policy Gateway validates the API version 350, and if needed pulls an updated API mapping from the IDQL API Mapping Cloud Service 320. In some embodiments, the validated policy is then mapped or transformed 340 from the IDQL declarative model and into the imperative policy model of the bespoke IAM system. In some embodiments, when storing policies at rest, the Policy Gateway encrypts policies using PKI. In some embodiments, the Policy Provisioning Point 360 executes the policy commands using the bespoke APIs 370. The Policy Provisioning Point 360 has error handling capabilities. In some embodiments, the Policy Gateway logs all activities.

In some embodiments, FIG. 3 is representative of a system and method of policy management where a universal authentication policy management solution is provided. In some embodiments, this includes management of authentication policies across one or more resources and identity systems. In some embodiments, an authentication policy is a policy that dictates how a user is authenticated, (often with a password, multi-factors, biometric, certificates, etc.) to access a particular resource. In some embodiments, universal authentication policy management is accomplished wherein the PPMP is used to configure an authentication policy in the IDQL language. In some embodiments, the PPMP encrypts the policy and communications the policy at rest and in motion. In some embodiments, the policy is distributed to one or more gateways, such as IDQL Policy Gateways that are, in some embodiments, registered with the IDQL fabric. In some embodiments, "registered" means authenticated and authorized to communicate as a result of a Public Key Infrastructure ("PKI") key exchange. In some embodiments, the Policy Gateway decrypts the communication from the PPMP. In some embodiments, the policy is validated by the Policy Gateway against the PPMP to ensure that the latest version of the policy is current and that the policy had not been tampered with in transmission through checksum. The Policy Gateway, in some embodiments, has error handling capabilities. In some embodiments, the Policy Gateway validates the API version, and if needed pulls an updated API mapping from the IDQL API Mapping Cloud Service. In some embodiments, the validated policy is then mapped or transformed from the IDQL declarative model and into the imperative policy model of the bespoke IAM system. In some embodiments, when storing policies at rest, the Policy Gateway encrypts policies using PKI. In some embodiments, the Policy Provisioning Point executes the policy commands using the bespoke APIs. The Policy Provisioning Point has error handling capabilities. In some embodiments, the Policy Gateway logs all activities.

In some embodiments, FIG. 3 is representative of a system and method of policy management where a universal authorization policy management solution is provided. In some embodiments, this includes management of authorization policies across one or more resources and identity systems. In some embodiments, an authorization policy is a policy that dictates what functions a user can perform, (authorization examples include business actions such as trade, buy, sell, start and stop as well as system level actions like change, read, write, update, delete) to perform a particular function. In some embodiments, universal authorization policy management is accomplished wherein the PPMP is used to configure an authorization policy in the IDQL language. In some embodiments, the PPMP encrypts the policy and communications for policy at rest and in motion. In some embodiments, the policy is distributed to one or more gateway, such as IDQL Policy Gateways that are, in some embodiments, registered with the IDQL fabric. In some embodiments, the Policy Gateway decrypts the communication from the PPMP. In some embodiments, the policy is validated by the Policy Gateway against the PPMP to ensure that the latest version of the policy is current and that the policy had not been tampered with in transmission through checksum. The Policy Gateway, in some embodiments, has error handling capabilities. In some embodiments, the Policy Gateway validates the API version, and if needed pulls an updated API mapping from the IDQL API Mapping Cloud Service. In some embodiments, the validated policy is then mapped or transformed from the IDQL declarative model and into the imperative policy model of the bespoke IAM system. In some embodiments, when storing policies at rest, the Policy Gateway encrypts policies using PKI. In some embodiments, the Policy Provisioning Point executes the policy commands using the bespoke APIs. The Policy Provisioning Point has error handling capabilities. In some embodiments, the Policy Gateway logs all activities.

In some embodiments, FIG. 3 is representative of a system and method of policy management where a universal provisioning policy management solution is provided. In some embodiments, this includes management of provisioning policies across one or more resources and identity systems. In some embodiments, a provisioning policy is a policy that dictates what functions a user can perform, (provisioning examples include actions join, leave, create) to perform a particular function. In some embodiments, universal provisioning policy management is accomplished wherein the PPMP is used to configure a provisioning policy in the IDQL language. In some embodiments, the PPMP encrypts the policy and communications the policy at rest and in motion. In some embodiments, the policy is distributed to one or more gateway, such as IDQL Policy Gateways that are, in some embodiments, registered with the IDQL fabric. In some embodiments, the Policy Gateway decrypts the communication from the PPMP. In some embodiments, the policy is validated by the Policy Gateway against the PPMP to ensure that the latest version of the policy is current and that the policy had not been tampered with in transmission through checksum. The Policy Gateway, in some embodiments, has error handling capabilities. In some embodiments, the Policy Gateway validates the API version, and if needed pulls an updated API mapping from the IDQL API Mapping Cloud Service. In some embodiments, the validated policy is then mapped or transformed from the IDQL declarative model and into the imperative policy model of the bespoke IAM system. In some embodiments, when storing policies at rest, the Policy Gateway encrypts policies using PKI. In some embodiments, the Policy Provisioning Point executes the policy commands using the bespoke APIs. The Policy Provisioning Point has error handling capabilities. In some embodiments, the Policy Gateway logs all activities.

In some embodiments, FIG. 3 is representative of a system and method of policy management where a universal auditing policy management solution is provided. In some embodiments, this includes management of auditing policies across one or more resources and identity systems. In some embodiments, an auditing policy is a policy that dictates how the actions of a user are recorded and what the policies are that govern access and the like to a resource, (what resources does user X have access to? Where are accesses to Resource X recorded/logged?). In some embodiments, universal auditing policy management is accomplished wherein the Primary PPMP is used to configure an auditing policy in the IDQL language. In some embodiments, the PPMP encrypts the policy and communications the policy at rest and in motion. In some embodiments, the policy is distributed to one or more gateway, such as IDQL Policy Gateways that are, in some embodiments, registered with the IDQL fabric. In some embodiments, the Policy Gateway decrypts the communication from the PPMP. In some embodiments, the policy is validated by the Policy Gateway against the PPMP to ensure that the latest version of the policy is current and that the policy had not been tampered with in transmission through checksum. The Policy Gateway, in some embodiments, has error handling capabilities. In some embodiments, the Policy Gateway validates the API version, and if needed pulls an updated API mapping from the IDQL API Mapping Cloud Service. In some embodiments, the validated policy is then mapped or transformed from the IDQL declarative model and into the imperative policy model of the bespoke IAM system. In some embodiments, when storing policies at rest, the Policy Gateway encrypts policies using PKI. In some embodiments, the Policy Provisioning Point executes the policy commands using the bespoke APIs. The Policy Provisioning Point has error handling capabilities. In some embodiments, the Policy Gateway logs all activities.

In some embodiments, one-to-many distributed policy management is provided. In some embodiments, one-to-many distributed policy management systems, apparatuses, and methods ensure consistent policy across multiple cloud and identity platforms. In some embodiments, a policy is one or more Authentication, Access Control, Authorization, Attribute, Auditing, or similar control. In some embodiments, the Policy Management Point updates multiple identity systems and translates policy from the syntax of the master policy to the syntax and structure of the managed identity systems.

In some embodiments, one-to-many distributed policy management includes utilizing the PPMP to configure policy for multiple identify and cloud systems. In some embodiments, the PPMP creates a meta policy in IDQL and distributes the policy to the bespoke IAM systems. In some embodiments, the Mapper/translator ingests the created IDQL, maps it to the bespoke IAM System and updates the IAM System through one or more APIs.

In some embodiments, unified policies are provided. In some embodiments, such unified policies are policies across multiple layers of the compute stack including (but not limited to) Application Layer, Platform Layer, Infrastructure Layer, Core Networking Layer (SASE), and the like. In some embodiments, a unified policy across multiple layers of the compute stack is provided, including, in some embodiments, a method providing consistent policy across multiple layers of the compute stack, from the application to the middleware, to infrastructure and identity must be managed consistently across the stack. In some embodiments, a policy is one or more Authentication, Access Control, Authorization, Attribute, Auditing, or similar control. In some embodiments, the Policy Management Point updates multiple identity systems and translates policy from the syntax of the master policy to the syntax and structure of the managed identity systems.

In some embodiments, policy is unified across an entire compute stack. In some embodiments, the PPMP is used to configure policy for identity systems that exist on each level of the compute stack. For instance—the Web Access Management ("WAM") Identity systems of the Application tier, and the Microservices and Platform identity systems, and the identity systems that underpin the Infrastructure layer as well as the networking infrastructure. In some embodiments, the PPMP creates a meta policy in IDQL and distributes the policy to the bespoke IAM systems across the computing tiers. In some embodiments, the Mapper/translator ingests the IDQL, maps it to the bespoke IAM System and updates the IAM System through its APIs.

In some embodiments, cross-framework policy mapping is provided. In some embodiments, cross-framework policy provides for unified policies across multiple policy frameworks, like Secure Access Service Edge ("SASE") and IDQL. Unified policies are provided for, in some embodiments, across multiple policy frameworks, like SASE, IDQL, and the like wherein the meta policy defined by the PPMP can be translated from IDQL into another framework such as SASE such that an administrator can set policies in IDQL. In some embodiments, these policies are translated and adapted into corresponding SASE policies. In some embodiments, a policy is one or more Authentication, Access Control, Authorization, Attribute, Auditing, or similar control. In some embodiments, the Policy Management Point defines the IDQL policy and for cross-framework translation a specialized "profile" is added to accommodate the specific extended requirements of a framework (like SASE). In some embodiments, the administrator can set the extended configuration as part of the IDQL SASE profile. Then, in some embodiments, the Mapper translates policy from the syntax of the master policy to the syntax and structure of the managed identity systems, including SASE systems.

In some embodiments, unified policy across the different frameworks is accomplished wherein the PPMP is used to configure policy for identity systems with each layer of the stack having an IDQL Profile. For instance, the WAM Identity systems of the Application tier supports IDQL WAM Profile, and the Microservices and Platform identity systems use IDQL PaaS Profile, and the identity systems that underpin the Infrastructure layer as well as the networking infrastructure use the IDQL IaaS Profile. In some embodiments, systems concerned with core networking use the IDQL SASE Profile. Other IDQL Profiles can be used to reliably extend IDQL policies into other frameworks. In some embodiments, the PPMP creates a meta policy in IDQL and distributes the policy to the bespoke IAM systems across the computing tiers. In some embodiments, the Mapper/translator ingests the IDQL, maps it to the bespoke IAM System and updates the IAM System through its APIs.

In some embodiments, a PPMP updates multiple distributed Policy Gateways at a time. In some embodiments, a manager or user configures the PMPP to update multiple distributed policy gateways at one time. In some embodiments, the PPMP is where policies are managed; and in some embodiments a policy is one or more Authentication, Access Control, Authorization, Attribute, Auditing, or similar control. In some embodiments, the PPMP pushes policies out across distributed environments to be enforced remotely by distributed Policy Enforcement Points and related identity systems. In some embodiments, the PPMP pushes policies across heterogenous technologies and heterogenous identity systems. Thus, in some embodiments, with a single command, the PPMP pushes policies to designated identity systems.

In some embodiments, the PPMP acts as a hub where policies and managed identity systems are known. In some embodiments, such policies and managed identity systems are: which system(s) are to be managed; what the policies are for these system(s); verify delivery of policy to the identity system(s); log delivery of and creation of policy in the identity system(s); and the like. In some embodiments, one or more user, such as an administrator, utilizes the PPMP to assign policies to identity systems and related protected resources. In some embodiments, administrators select one or more identity systems to have policies sent to. In some embodiments, by selecting multiple identity systems to be updated at the PPMP, policy is pushed to multiple identity systems with a single command.

In some embodiments, the system, apparatus, and method provide for unified policies across multiple policy frameworks, like SASE and IDQL. In some embodiments, the meta policy defined by the PPMP is translated from IDQL into another framework such as SASE such that an administrator can set policies in IDQL and these policies are translated and adapted into corresponding SASE policies. In some embodiments, the Policy Management Point defines the IDQL policy and for cross-framework translation a specialized "profile" is added to accommodate the specific extended requirements of a framework (like SASE) and the administrator can set the extended configuration as part of the IDQL SASE profile. In some embodiments, then the Mapper translates policy from the syntax of the master policy to the syntax and structure of the managed identity systems, including SASE systems.

In some embodiments, such unified policy across the different frameworks is accomplished wherein the PPMP is used to configure policy for identity systems with each layer of the stack having an IDQL Profile. For instance, in some embodiments the Web Access Management ("WAM") Identity systems of the Application tier supports IDQL WAM Profile, whereas the Microservices and Platform identity systems use IDQL Platform Profile, and the identity systems that underpin the Infrastructure layer as well as the networking infrastructure use the IDQL IaaS Profile. In some embodiments, systems concerned with core networking use the IDQL SASE Profile.

In some embodiments, PPMP validates what policies can be built from a bespoke IAM system. In some embodiments, PPMP uses typing to prevent policies that can't be enforced or are not sound, from being created, thus providing a contextual policy restriction system and method. In some embodiments, one or more Administrators configures one or more policies. In some embodiments, the PPMP tests each policy "on the fly," or as they are entered by one or more users and/or administrators, against multiple identity systems. In some embodiments, the testing produces a signal indicating the policy as valid or invalid. In some embodiments, only valid policy configurations are shown to the administrator (and/or user). In some embodiments, if a query can't be performed, then the reason why it fails is displayed, and the policy cannot be saved in its invalid state.

In some embodiments, one or more policy governance point is provided. In some embodiments, a policy governance point is used to query distributed policies for the purposes of consolidated reporting and auditing user and resource access. In some embodiments, one or more Policy Governance Points ("PGPs") queries the distributed Policy Gateways to build a report of resource access and other identity policies across the distributed identity ecosystem. In some embodiments, the Policy Gateway converts the PGP's query from IDQL to the bespoke API and queries the bespoke API. For example, such a query is similar to "what policies govern Resource X in Identity System X on Cloud 1, Cloud 2 and Platform X?" In some embodiments, the results are returned by the bespoke API which the Mapper that translates bespoke data into IDQL formatted data. In some embodiments, the PGP queries distributed Policy Gateways to build a report of all user access for all apps across all platforms. In some embodiments, the Policy Gateway converts the PGP's query from IDQL to the bespoke API and queries the bespoke API. For example, "what policies govern User X in Identity System X?", "What Resources can User X access on Cloud 1, Cloud 2 and Platform X?" In some embodiments, the results are returned by the bespoke API which the Mapper that translates bespoke data into IDQL formatted data.

Figure 4:
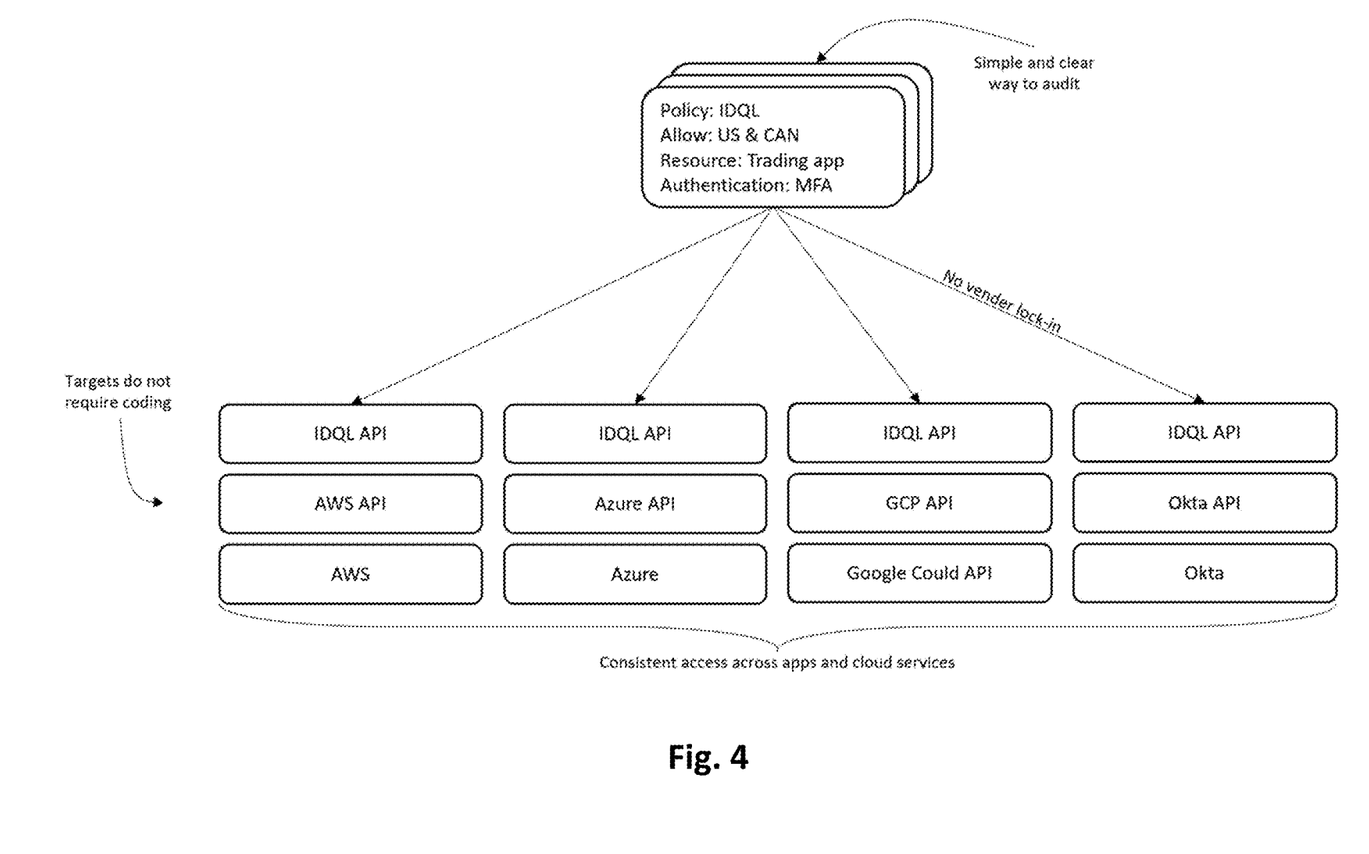
FIG. 4 is a flowchart depicting structural and/or conceptual relationships according to some embodiments of the present invention.

Referring to FIG. 4, in some embodiments, the system, apparatus, and method contemplate where a single command updates multiple identity systems and clouds. In some embodiments, such a command is similar in structure to "Give (or revoke) access to user X across all systems including AWS, Azure, GCP, and on-premises systems." In some embodiments, a PPMP issues command to perform an identity action, such as "give or revoke access by user X across all systems." In some embodiments, the Policy Gateway in turn translates the IDQL policy into bespoke identity system policy. In some embodiments, the Policy Gateway then executes the policy in the bespoke identity system. In some embodiments, the Policy Gateway validates that the change is affected and records the event. In some embodiments, the PPMP receives confirmation of the action from the affected Policy Gateways.

In some embodiments, version control is included. In some embodiments, PPMP and/or Policy Gateways all use policies with version controls. In some embodiments, such version control includes management of policies in an incremental way, wherein some embodiments the version of a policy can be incremented and rolled back. In some embodiments, PPMP and/or Policy Gateways store and/or manage policies in configuration files or records that are version controlled. In some embodiments, the storage is on one or more memory associated with the system. In some embodiments, PPMP and/or Policy Gateways "roll back" or restore a different version of the policy based on date or sequence by selecting a specific version of a policy. In some embodiments, one or more user initiates a roll back of such versions.

In some embodiments, one or more policy profile extension are included. In some embodiments, a Policy Profile Extension defines and manages one or more corner, or atypical, cases between policy systems. In some embodiments, policy mapping from one domain, or system to another involve a mismatch of policies. In some embodiments, policies that fall outside a defined set of use cases of a "core" policy are considered corner cases. These corner cases extend the core policy using different profiles. In some embodiments, for instance, incorporating network context into a Core Networking IDQL policy that isn't used in the App Access Management IDQL policies.

In some embodiments, IDQL Policies are defined as: application access; platform access; infrastructure access; core networking access; and the like. In some embodiments, normalization of an access policy across multiple systems is performed. In some embodiments, the normalization occurs across different systems' definition of application access. In some embodiments, one or more profiles are utilized for such normalization. In some embodiments, IDQL policy profiles contain the requisite information needed for policy. For instance, when unifying application access and core networking access policies, the concept of a trusted device is needed for a core networking policy but not for application access policy. In some embodiments, an IDQL core networking access policy profile contains the extended data set and details needed to complement and complete the core networking access policy, for instance including data related to device trust.

In some embodiments, one or more universal definitions are provided. In some embodiments, the universal definition is of protected resources and one or more tag-based labels are utilized. In some embodiments, resources, users and/or policies are tagged or labeled. In some embodiments, such tagging or labeling creates a dynamic Resource Group based on whether a group of resources share common tags. In some embodiments, a dynamic resource group provides one or more otherwise unaffiliated resource, policy, user, or the like which are linked through common tags. In some embodiments resources, users, and/or policies tags/labels are multiple or, in some embodiments, singular, for instance, a given resource may have the tags, #sensitive and #proprietary. In some embodiments, these tags and labels are used in policy enforcement, for instance, "User X can access Resources with tags #sensitive and #proprietary."

Figure 5:
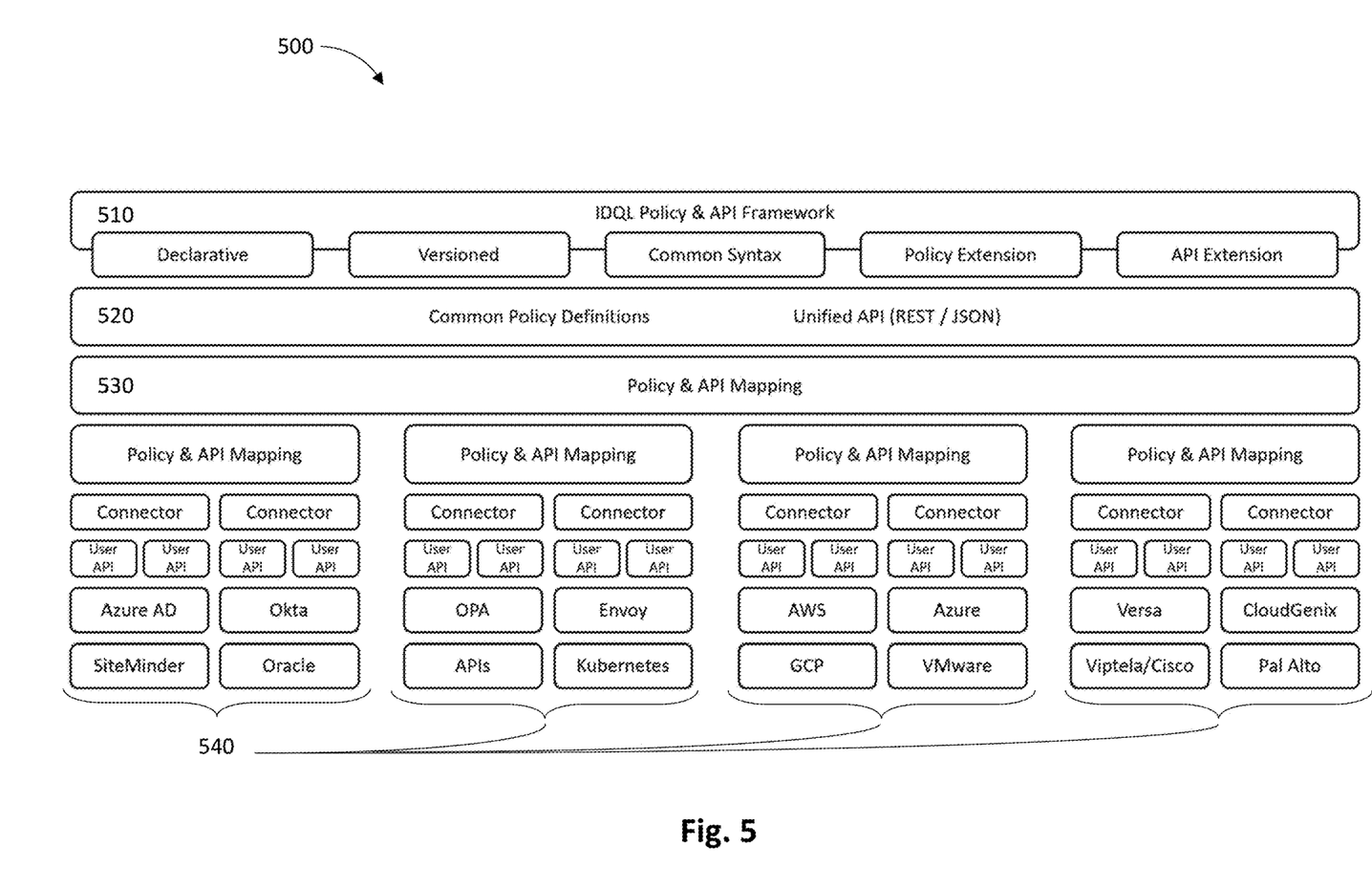
FIG. 5 is a flowchart depicting structural and/or conceptual relationships according to some embodiments of the present invention.

Referring to FIG. 5, in some embodiments a system architecture 500 is provided. In some embodiments, the system architecture 500 is hosted or stored in a memory with machine-readable code, and in some embodiments is retained in a non-transitory state and/or embodiment. In some embodiments, the system architecture is implemented in one or more hardware components, such as a physical computing device with a memory coupled to a processor. In some embodiments, the system architecture 500 includes a IDQL Policy and API Framework layer 510, which performs one of more of the processes and methods described herein. In some embodiments, this layer includes one or more commands and/or policies, which include, but are not limited to, declarative commands/policies, versioned policies, common syntax commands/policies, policy extension, API extension, and the like. In some embodiments, the system architecture 500 includes Policy definitions and Unified API Layer 520 which performs one of more of the processes and methods described herein. In some embodiments, this layer is utilized, at least in part, to unify management of one or more bespoke system 540 as described herein. In some embodiments, the system architecture 500 includes a Policy and API Mapping Layer 530, which performs one of more of the processes and methods described herein. In some embodiments, this layer maps, or associates, one or more policy and/or API elements of a preceding layer with one or more policy and/or API element of a bespoke system 540. In some embodiments, the system architecture 500 further includes one or more bespoke system 540, which performs one of more of the processes and methods described herein.

The present invention provides among other things a system, apparatus, and method that provides the consistent control, simplicity, automation, and compliance needed by customers to scale workloads across different clouds, across different identity systems, and across the computing stack.

Those skilled in the art can recognize that numerous variations and substitutions can be made in the embodiments of the present invention, its use, and its configuration to achieve substantially the same results as achieved by the embodiments described herein. Accordingly, there is no intention to limit the invention to the disclosed exemplary forms. Many variations, modifications, and alternatives fall within the scope and spirit of the disclosed invention.

Various embodiments of the present invention provide a system of one or more computers or processors configured to perform the actions, steps, or methods described herein by virtue of having software, firmware, hardware, or a combination of them installed on the system. As described herein, various embodiments provide a system for policy management. The system may include a PPMP configured to define a universal policy for a plurality of bespoke systems; and a policy gateway configured to receive the universal policy from the PPMP, translate the universal policy into a bespoke policy for each of the plurality of bespoke systems, and implement each of the bespoke policies in each of the plurality of bespoke systems. Other embodiments may include corresponding computer systems, apparatuses, and computer programs recorded on one or more computer storage devices, each configured to perform the actions, steps, or methods described herein.

Implementations may include one or more of the following features. The system where the universal policy is defined using a declarative syntax. The universal policy is defined using a human-readable data serialization standard. The PPMP is configured to securely distribute the bespoke policy to the policy gateway. The policy gateway validates the universal policy received from the PPMP. The policy gateway implements a bespoke policy using an application programming interface ("API") of a bespoke system. The policy gateway monitors each bespoke system for policy changes. The universal policy is one or more of an authentication policy, an access control policy, an authorization policy, an attribute policy, and an auditing policy. Each policy gateway is configured to implement the universal policy in a plurality of bespoke systems. Implementations of the described techniques may include hardware, a method or process, or computer software on a computer-accessible medium.

One general aspect includes a system for policy management comprising a PPMP configured to define a universal policy in a declarative syntax for each of a plurality of bespoke systems. The system also includes a plurality of policy gateways configured to receive the universal policy from the PPMP, authenticate the universal policy received from the PPMP, validate the universal policy received from the PPMP, translate the universal policy received from the PPMP into a bespoke policy for at least one of the bespoke systems, authenticate each bespoke policy against an associated bespoke system, and implement each of the bespoke policies in each of the plurality of bespoke systems using an API of each of the bespoke systems. Other embodiments of this aspect include corresponding computer systems, apparatuses, and computer programs recorded on one or more computer storage devices, each configured to perform the actions, steps, or methods described herein.

One general aspect includes a method for policy management. The method comprises defining a universal policy for a plurality of bespoke systems; translating the universal policy into a bespoke policy for each of a plurality of bespoke systems, and implementing each of the bespoke policies in each of the plurality of bespoke systems. Other embodiments of this aspect include corresponding computer systems, apparatus, and computer programs recorded on one or more computer storage devices, each configured to perform the actions, steps, or methods described herein.

Implementations may include one or more of the following features. The method where the defining step may include defining, at a PPMP, a universal policy for a plurality of bespoke systems. The translating step may include translating, at a policy gateway, the universal policy into a bespoke policy for each of a plurality of bespoke systems. The implementing step may include implementing, at a policy gateway, each of the bespoke policies in each of the plurality of bespoke systems. The method may include the step of sending the universal policy to a policy gateway. The universal policy is defined using a declarative syntax. The universal policy may be defined using a human-readable data serialization standard. A PPMP is configured to securely distribute the bespoke policy to a policy gateway. A policy gateway validates the universal policy received from a PPMP. A policy gateway implements a bespoke policy using an API of a bespoke system. A policy gateway monitors each bespoke system for policy changes. The universal policy is one or more of an authentication policy, an access control policy, an authorization policy, an attribute policy, and an auditing policy. Each policy gateway is configured to implement the universal policy in a plurality of bespoke systems. Implementations of the described techniques may include hardware, a method or process, or computer software on a computer-accessible medium.

One general aspect includes a method for policy management. The method comprises defining, at a primary policy management point (PPMP), a universal policy in a declarative syntax for each of a plurality of bespoke systems; receiving the universal policy from the PPMP at a plurality of policy gateways; authenticating the universal policy received from the PPMP at the plurality of policy gateways;

validating the universal policy received from the PPMP at the plurality of policy gateways; translating, at each of the policy gateways, the universal policy received from the PPMP into a bespoke policy for at least one of the bespoke systems; implementing, at each of the policy gateways, at least one of said bespoke policies in at least one of the plurality of bespoke systems using an API at least one of the bespoke systems. Other embodiments of this aspect include corresponding computer systems, apparatuses, and computer programs recorded on one or more computer storage devices, each configured to perform the actions, steps, or methods described herein.

One general aspect includes an apparatus for policy management comprising a processor configured to define a universal policy for a plurality of bespoke systems. Other embodiments of this aspect include corresponding computer systems, apparatus, and computer programs recorded on one or more computer storage devices, each configured to perform the actions, steps, or methods described herein.

Implementations may include one or more of the following features. The apparatus or processor where the universal policy is defined using a declarative syntax. The universal policy may be defined using a human-readable data serialization standard. The processor may be further configured to securely distribute the bespoke policy to a policy gateway. A policy gateway validates the universal policy received from the PPMP. A policy gateway implements a bespoke policy using an API of a bespoke system. A policy gateway monitors each bespoke system for policy changes. The universal policy is one or more of an authentication policy, an access control policy, an authorization policy, an attribute policy, and an auditing policy. Each policy gateway is configured to implement the universal policy in a plurality of bespoke systems. Implementations of the described techniques may include hardware, a method or process, or computer software on a computer-accessible medium.

One general aspect includes a method for policy management defining a universal policy for a plurality of bespoke systems. Other embodiments of this aspect include corresponding computer systems, apparatus, and computer programs recorded on one or more computer storage devices, each configured to perform the actions of the methods.

Implementations may include one or more of the following features. The method where the defining step may include defining, at a PPMP, a universal policy for a plurality of bespoke systems. The universal policy may be defined using a human-readable data serialization standard. The universal policy may be defined using a declarative syntax. The method may include securely distributing the bespoke policy to a policy gateway. The method may include validating, at a policy gateway, the universal policy received from a PPMP. The method may include implementing, at a policy gateway, a bespoke policy using an API of a bespoke system. The method may include monitoring, at a policy gateway, each bespoke system for policy changes. The universal policy is one or more of an authentication policy, an access control policy, an authorization policy, an attribute policy, and an auditing policy. The method may include implementing, at a plurality of policy gateways, the universal policy in a plurality of bespoke systems. Implementations of the described techniques may include hardware, a method or process, or computer software on a computer-accessible medium.

One general aspect includes an apparatus for policy management comprising a processor configured to receive a universal policy, translate the universal policy into a bespoke policy for a plurality of bespoke systems, and implement each of the bespoke policies in each of the plurality of bespoke systems. Other embodiments of this aspect include corresponding computer systems, apparatuses, and computer programs recorded on one or more computer storage devices, each configured to perform the actions of the methods.

Implementations may include one or more of the following features. The apparatus where the universal policy is defined using a declarative syntax. The universal policy may be defined using a human-readable data serialization standard. The universal policy may be received from a PPMP. The PPMP may be configured to securely distribute the universal policy to the processor. The processor can validate the universal policy received from the PPMP. The processor can implement a bespoke policy using an API of a bespoke system. The processor can monitor each bespoke system for policy changes. The universal policy is one or more of an authentication policy, an access control policy, an authorization policy, an attribute policy, and an auditing policy. Implementations of the described techniques may include hardware, a method or process, or computer software on a computer-accessible medium.

One general aspect includes an apparatus for policy management comprising a processor configured to receive a universal policy from a PPMP, where the universal policy may include statements in a declarative syntax; authenticate the universal policy received from the PPMP; validate the universal policy received from the PPMP; translate the universal policy into a bespoke policy for a plurality of bespoke systems; authenticate the bespoke policy against each bespoke system; and implement each of the bespoke policies in each of the plurality of bespoke systems using an API of each of the bespoke systems. Other embodiments of this aspect include corresponding computer systems, apparatus, and computer programs recorded on one or more computer storage devices, each configured to perform the actions of the methods.

One general aspect includes a method for policy management. The method comprises receiving a universal policy; translating the universal policy into a bespoke policy for a plurality of bespoke systems, and implementing each of the bespoke policies in each of the plurality of bespoke systems. Other embodiments of this aspect include corresponding computer systems, apparatus, and computer programs recorded on one or more computer storage devices, each configured to perform the actions of the methods.

Implementations may include one or more of the following features. The method where the universal policy is defined using a declarative syntax. The universal policy is defined using a human-readable data serialization standard. The method may include the step of receiving the universal policy from a PPMP. A PPMP may be configured to securely distribute the universal policy. The method may include the step of validating the universal policy received from the PPMP. The implementing step may include implementing a bespoke policy using an API of a bespoke system. The method may include the step of monitoring each bespoke system for policy changes. The universal policy may include one or more of an authentication policy, an access control policy, an authorization policy, an attribute policy, and an auditing policy. Implementations of the described techniques may include hardware, a method or process, or computer software on a computer-accessible medium.

One general aspect includes a method for policy management. The method comprises receiving a universal policy including a statement in a declarative syntax. Other embodiments of this aspect include corresponding computer systems, apparatuses, and computer programs recorded on one or more computer storage devices, each configured to perform the actions of the methods.

Various embodiments of the computer program, apparatus, system, and method of embodiments of the present invention are implemented in hardware, software, firmware, and/or combinations thereof, which broadly includes server devices, computing devices, and a communications network. Various embodiments of the server devices include computing devices that provide access to one or more general computing resources, such as Internet services, electronic mail services, data transfer services, and the like. In some embodiments the server devices also provide access to a database that stores information and data necessary and/or desirable for the implementation of the computer program, apparatus, system, and method of the present invention, as discussed herein.

Various embodiments of the server devices and the computing devices include any device, component, or equipment with a processing element and associated memory elements. In some embodiments the processing element implements an operating system, and in some such embodiments is capable of executing a computer program, which is also generally known as instructions, commands, software code, executables, applications (apps), and the like. In some embodiments the processing element includes processors, microprocessors, microcontrollers, field programmable gate arrays, and the like, or combinations thereof. In some embodiments the memory elements can store or retaining the computer program and in some such embodiments also store data, typically binary data, including text, databases, graphics, audio, video, combinations thereof, and the like. In some embodiments the memory elements also are known as a "computer-readable storage medium" and in some such embodiments include random access memory ("RAM"), read only memory ("ROM"), flash drive memory, floppy disks, hard disk drives, optical storage media such as compact discs (CDs or CDROMs), digital video disc ("DVD"), Blu-Ray™, and the like, or combinations thereof. In addition to these memory elements, in some embodiments the server devices further include file stores comprising a plurality of hard disk drives, network attached storage, or a separate storage network.

Various embodiments of the computing devices specifically include mobile communication devices (including wireless devices), workstations, desktop computers, laptop computers, palmtop computers, tablet computers, portable digital assistants, smart phones, wearable devices and the like, or combinations thereof. Various embodiments of the computing devices also include voice communication devices, such as cell phones or landline phones. In some preferred embodiments, the computing device has an electronic display, such as a cathode ray tube, liquid crystal display, plasma, or touch screen that is operable to display visual graphics, images, text, etc. In certain embodiments, the computer program of the present invention facilitates interaction and communication through a graphical user interface ("GUI") that is displayed via the electronic display. The GUI enables the user to interact with the electronic display by touching or pointing at display areas to provide information to the user control interface, which is discussed in more detail below. In additional preferred embodiments, the computing device includes an optical device such as a digital camera, video camera, optical scanner, or the like, such that the computing device can capture, store, and transmit digital images and/or videos.

In some embodiments the computing devices includes a user control interface that enables one or more users to share information and commands with the computing devices or server devices. In some embodiments, the user interface facilitates interaction through the GUI described above or, in other embodiments comprises one or more functionable inputs such as buttons, keyboard, switches, scrolls wheels, voice recognition elements such as a microphone, pointing devices such as mice, touchpads, tracking balls, styluses. Embodiments of the user control interface also include a speaker for providing audible instructions and feedback. Further, embodiments of the user control interface comprise wired or wireless data transfer elements, such as a communication component, removable memory, data transceivers, and/or transmitters, to enable the user and/or other computing devices to remotely interface with the computing device.

In various embodiments the communications network will be wired, wireless, and/or a combination thereof, and in various embodiments will include servers, routers, switches, wireless receivers and transmitters, and the like, as well as electrically conductive cables or optical cables. In various embodiments the communications network will also include local, metro, or wide area networks, as well as the Internet, or other cloud networks. Furthermore, some embodiments of the communications network include cellular or mobile phone networks, as well as landline phone networks, public switched telephone networks, fiber optic networks, or the like.

Various embodiments of both the server devices and the computing devices are connected to the communications network. In some embodiments server devices communicate with other server devices or computing devices through the communications network. Likewise, in some embodiments, the computing devices communicate with other computing devices or server devices through the communications network. In various embodiments, the connection to the communications network will be wired, wireless, and/or a combination thereof. Thus, the server devices and the computing devices will include the appropriate components to establish a wired or a wireless connection.

Various embodiments of the computer program of the present invention run on computing devices. In other embodiments the computer program runs on one or more server devices. Additionally, in some embodiments a first portion of the program, code, or instructions execute on a first server device or a first computing device, while a second portion of the program, code, or instructions execute on a second server device or a second computing device. In some embodiments, other portions of the program, code, or instructions execute on other server devices as well. For example, in some embodiments information is stored on a memory element associated with the server device, such that the information is remotely accessible to users of the computer program via one or more computing devices. Alternatively, in other embodiments the information is directly stored on the memory element associated with the one or more computing devices of the user. In additional embodiments of the present invention, a portion of the information is stored on the server device, while another portion is stored on the one or more computing devices. It will be appreciated that in some embodiments the various actions and calculations described herein as being performed by or using the computer program will actually be performed by one or more computers, processors, or other computational devices, such as the computing devices and/or server devices, independently or cooperatively executing portions of the computer program.

A user can access various embodiments of the present invention via an electronic resource, such as an application, a mobile "app," or a website. In certain embodiments, portions of the computer program are embodied in a stand-alone program downloadable to a user's computing device or in a web-accessible program that is accessible by the user's computing device via the network. For some embodiments of the stand-alone program, a downloadable version of the computer program is stored, at least in part, on the server device. A user downloads at least a portion of the computer program onto the computing device via the network. After the computer program has been downloaded, the program is installed on the computing device in an executable format. For some embodiments of the web-accessible computer program, the user will simply access the computer program via the network (e.g., the Internet) with the computing device.

Although the foregoing detailed description of the present invention has been described by reference to exemplary embodiments, it will be understood that certain changes, modification or variations may be made in embodying the above invention may be achieved by those skilled in the art without departing from the spirit and scope of the invention, and that such changes, modification or variations are to be considered as being within the overall scope of the present invention. Consequently, the scope of the present invention is intended to be limited only by the claims.

What is claimed is:

1. A system for policy management, the system comprising:
   a primary policy management point ("PPMP") comprising a microprocessor configured to define a universal policy for a plurality of bespoke systems, wherein the universal policy is defined using a declarative syntax in a human-readable data serialization standard; and
   a policy gateway configured to:
      receive the universal policy from the PPMP;
      validate the universal policy received from the PPMP to ensure the universal policy is active and has not been tampered with using a checksum;
      translate the universal policy into a bespoke policy for each of the plurality of bespoke systems; and
      implement each of the bespoke policies in each of the plurality of bespoke systems.

2. The system of claim 1, wherein the PPMP is configured to securely distribute the bespoke policy to the policy gateway.

3. The system of claim 1, wherein the policy gateway implements a bespoke policy using an application programming interface ("API") of a bespoke system.

4. The system of claim 1, wherein the policy gateway monitors each bespoke system for policy changes.

5. The system of claim 1, wherein the universal policy is one or more of an authentication policy, an access control policy, an authorization policy, an attribute policy, and an auditing policy.

6. The system of claim 1, further comprising a plurality of policy gateways, wherein each policy gateway is configured to implement the universal policy in a plurality of bespoke systems.

7. The system of claim 1, wherein said policy gateway is one of a plurality of policy gateways, each of the plurality of policy gateways configured to:
   receive the universal policy from the PPMP;
   authenticate the universal policy received from the PPMP;
   translate the universal policy received from the PPMP into a bespoke policy for at least one of the bespoke systems;
   authenticate each bespoke policy against an associated bespoke system; and
   implement each of the bespoke policies in each of the plurality of bespoke systems using an application programming interface ("API") of each of the bespoke systems.

8. A method for policy management comprising:
   defining a universal policy using a declarative syntax in a human-readable data serialization standard for a plurality of bespoke systems;
   validating the universal policy to ensure the universal policy is active and has not been tampered with using a checksum;
   translating the universal policy into a bespoke policy for each of a plurality of bespoke systems; and
   implementing each of the bespoke policies in each of the plurality of bespoke systems.

9. The method of claim 8, wherein the defining step comprises defining, at a primary policy management point ("PPMP"), a universal policy for a plurality of bespoke systems.

10. The method of claim 9, wherein the translating step comprises translating, at a policy gateway, the universal policy into a bespoke policy for each of a plurality of bespoke systems.

11. The method of claim 8, wherein the implementing step comprises implementing, at a policy gateway, each of the bespoke policies in each of the plurality of bespoke systems.

12. The method of claim 8, further comprising the step of sending the universal policy to a policy gateway.

13. The method of claim 8, wherein a PPMP is configured to securely distribute the bespoke policy to a policy gateway.

14. The method of claim 8, wherein a policy gateway monitors each bespoke system for policy changes.

15. A method for policy management comprising:
   defining, at a primary policy management point ("PPMP"), a universal policy in a declarative syntax using a human-readable data serialization standard for each of a plurality of bespoke systems;
   receiving the universal policy from the PPMP at a plurality of policy gateways;
   authenticating the universal policy received from the PPMP at the plurality of policy gateways;
   validating the universal policy received from the PPMP at the plurality of policy gateways to ensure the universal policy is active and has not been tampered with using a checksum;
   translating, at each of the policy gateways, the universal policy received from the PPMP into a bespoke policy for at least one of the bespoke systems;
   implementing, at each of the policy gateways, at least one of said bespoke policies in at least one of the plurality of bespoke systems using an application programming interface ("API") at least one of the bespoke systems.

* * * * *